Patented Aug. 14, 1945

2,382,931

UNITED STATES PATENT OFFICE 2,382,931

HYDRAULIC FLUIDS

John C. Woodhouse, Cragmere, and Kenneth E. Walker, Wilmington, Del., assignors to E. I. du Pont de Nemours & Company, Wilmington, Del., a corporation of Delaware No Drawing. Application September 27, 1941, Serial No. 412,608

5 Claims. (Cl. 252—76)

This invention relates to compositions of matter and more particularly fluids for use in hydraulically operated apparatus such, for example, as hydraulic brakes, hydraulic clutches, and similar hydraulically operated mechanisms.

Reference is made to application Serial No. 291,936, filed August 25, 1939, relating broadly to acetals and hydraulic fluids. Reference is also made to U. S. Patent 2,298,186 issued October 6, 1942, relating to esters of (alkoxyalkoxy) aliphatic alcohols and processes for their preparation.

Various proposals have been made to use mixtures of alcohol and castor oil, glycerine, and the like, for hydraulic transmission of power such as for actuating the pressure-operated elements of hydraulic brake systems, shock absorber systems, hydraulic clutches and similarly operated apparatus. In a great number of fluids previously proposed, however, there have been numerous disadvantages, such, for example, as wide changes in viscosity, corrosive or degrading effect of the fluids upon metal and rubber parts of hydraulic apparatus, tendencies toward gasification and solidification under higher and lower temperature conditions, respectively; all of these and similar disadvantages being drawbacks to commercial utilization of many previously proposed fluids.

It is an object of the present invention to overcome these and other undesirable characteristics and particularly to produce an improved hydraulic fluid which is characterized by having a wide range of usefulness under extremely variable operating conditions.

Other objects and advantages of this invention will be apparent by reference to the following specification in which its preferred details and embodiments are described.

According to this invention improved hydraulic fluids are produced by utilizing as an ingredient one or more normally liquid non-cyclic acetals containing a hydroxyl group and having the following general structure:

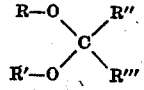

where R and R' are any aliphatic radical having not more than 5 carbon atoms and may contain substituent groups and R'' and R''' are hydrogen or any aliphatic radical containing not more than 4 carbon atoms and may contain one or more substituent groups. At least one of the groups R, R', R'' and R''' must contain a hydroxyl group. These acetals may be prepared by reacting in the presence of an acid catalyst a non-cyclic acetal containing the desired components R, R'' and R''' with a monohydric or polyhydric alcohol having the desired component R'. If a polyhydric alcohol is used R' will contain the hydroxyl group.

The new and improved fluids of this invention are preferably maintained under neutral or alkaline conditions and are characterized by low viscosity at low temperatures, relatively slight change in viscosity with change in temperature, little or no corrosive or decomposing effect upon rubber and no gasification or solidification tendencies under the higher and lower temperature conditions normally encountered in automobile operation.

Among the non-cyclic acetals containing a hydroxyl group which may be utilized according to this invention are $\beta$-(methoxymethoxy) ethanol, $\beta$-(ethoxymethoxy) ethanol, $\beta$-(isopropoxymethoxy) ethanol, $\beta$-(n-propoxymethoxy) ethanol, $\beta$-(isobutoxymethoxy) ethanol, $\beta$-(n-butoxymethoxy) ethanol, $\beta$-(methoxymethoxy) propanol, $\gamma$-(methoxymethoxy) propanol, $\alpha$-methyl-$\beta$-(methoxymethoxy) ethanol, $\alpha$-methyl-$\beta$-(ethoxymethoxy) ethanol, $\beta$-($\alpha$-methoxyethoxy) ethanol, di-($\beta$-hydroxyethyl) formal, di-($\beta$-methoxy) ethanol, $\beta$-($\alpha$-methoxyisopropoxy) ethanol, $\beta$-($\alpha$-ethoxyisopropoxy) ethanol, $\alpha$-methyl-$\beta$-($\alpha$-methoxyethoxy) ethanol, di-($\beta$-hydroxypropyl) formal, di-($\gamma$-hydroxypropyl) formal.

Although, as previously indicated, non-cyclic acetals having the structure described above are desirable hydraulic fluid ingredients, we prefer to use $\beta$-(methoxymethoxy) ethanol having the formula, $CH_3OCH_2OCH_2CH_2OH$. This compound can be prepared by reacting methylal and ethylene glycol at 60° C. using a small amount, ca. ¼ to 1% by weight, of sulfuric acid as a catalyst. After reaction the catalyst is neutralized and the $\beta$-(methoxymethoxy) ethanol separated by distillation under a vacuum. $\beta$-(methoxymethoxy) ethanol is a water-white liquid boiling at 167–168° C. at 760 mm. and 78 to 80° C. at 30 mm., having a specific gravity of 1.04 at 25° C. and a refractive index of 1.4105 at 25° C.

To augment the lubricating properties of our fluid, the acetals of this invention may be mixed with any oil in which they are soluble, whether mineral, vegetable or animal, depending upon the particular application for which the mixture is designed. The term animal oil is used hereinafter in the broad sense to include all terrestrial animal, marine animal and fish oils. Of the many oils which occur naturally in this class, for admixture directly with acetals we prefer particularly to use an oil characterized by being a glyceride or other ester of fatty acids and more specifically one which contains hydroxy and unsaturated groups such as castor oil.

Derivatives of these oils may also be used such, for example, as the products obtained by blowing the oils with air or oxygen or the alcoholysis products obtained by reacting the vegetable or animal oil or blown oil with an acetal of the type herein described or with another hydroxyl containing compound. Among the many oils which may be utilized for making derivatives according to this invention there may be mentioned: almond, blackfish, candlenut, castor, China-wood, coconut, cod, corn, cottonseed, croton, eucalyptus, geranium, grape seed, hemp, juniper, lard, lemon, linseed, mustard seed, menhaden, neat's-foot, olive, oiticica, orange, palm, peanut, perilla, porpoise, rape-seed, seal, sesame, shark, sperm, tallow, train, soyabean, sunflower, teaseed, tung, walnut, whale, wool and the like.

Acetals illustrative of those with which the vegetable or animal oil may be reacted are those described specifically above. Thus, part of the acetal containing a hydroxyl group, utilized as a hydraulic fluid ingredient, may be reacted with a suitable oil by an alcoholysis reaction to produce an ester of the oil acids. Other derivatives of the oils previously mentioned which may be utilized as lubricants for use with acetals include those derivatives obtained by alcoholysis of these oils by any simple alcohol or polyhydric alcohol such as methyl, ethyl, normal and isopropyl, butyls and the like. Similarly, such polyhydric alcohols as ethylene glycol, 1,2 and 1,3 propylene glycols, butylene glycols, as well as diethylene and dipropylene glycols, glycerine and the like may be utilized. All the specific mono-, di- and trihydric alcohols hereinbefore set forth are representative and illustrative only of alcohols which may be utilized, according to this invention, for the production of derivatives of animal and vegetable oils and should not be taken as a limitation thereof.

In the alcoholysis of vegetable or animal oils such as previously described, these mono-, di- and trihydric alcohols, or alcoholic bodies such as acetals containing a hydroxyl group may be mixed with varying proportions of vegetable or animal oils or blown oils, as previously described and heated preferably to a temperature of from 50–250° C. We may use stoichiometric proportions of oil and alcoholic bodies necessary for the alcoholysis reaction, but we prefer to use an excess of alcoholic body giving as high as 1½ to 20 times the quantity required for complete reaction. This excess speeds up the reaction and enables its rapid completion under lower temperatures. The excess alcohol or alcoholic body may or may not be removed from the final product, as desired. We prefer to operate the process in the presence of catalysts such, for example, as potassium oleate or ricinoleate, potassium carbonate, potassium hydroxide, zinc oxide, lead oxide, and the like. We have found that catalyst concentrations of from about 0.01 to 8% (by weight, based upon the reaction mixture of oil plus alcoholic body) are satisfactory although we prefer to utilize about 0.5 to 6.5% concentration thereof i. e., from about 19 to 246 grams per gallon. If desired, we may also operate the process in the presence of solvents, such as, ether, pyridine, and the like, which may, if desired, be thereafter utilized as ingredients of the final hydraulic fluid composition. Pressures are utilized which are necessary to allow the use of temperatures which in turn will effect a suitably rapid reaction rate, particularly where low boiling reactants are involved.

The acetals of this invention are relatively non-corrosive but if the acetals, or other ingredients, should react slightly with parts of the hydraulic system corrosion inhibitors may be found. Among the many corrosion inhibitors which may be used are, sodium nitrite, calcium nitrite, borax, sodium bichromate, potassium bichromate, sodium chromate, potassium chromate, triethanolamine oleate, triethanolamine ricinoleate, sodium phosphate, potassium phosphate, sodium acid phosphate, potassium acid phosphate and the like. The preferred amounts of inhibitor are from 0.1 to 2.0 although 0.05 to 3% will be satisfactory.

Although the acetals, such as previously described, are admirably fitted by themselves for hydraulic fluid purposes, we have found that improvements upon this fluid can in some instances be obtained by utilizing such acetals in admixture or combination with one or more organic diluents. Among the organic materials susceptible for admixture as diluents are: alcohols such as the mono- and polyhydric, alicyclic, aromatic and amine alcohols, including specifically methanol, propanol, butanol, isobutanol, the alcohols boiling in the range of 120–160° C. obtained by the catalytic reduction of carbon monoxide under pressure, octanol, diacetone alcohol, ethylene and propylene glycol, glycerol, sorbitol, cyclohexanol, benzyl alcohol; organic esters such as ethyl and butyl acetate; ethers such as diisobutyl, ethyl tertiary butyl, and methyl ricinoleyl ethers, methyl ether of ethylene glycol, butyl and isobutyl ether of ethylene glycol, ethyl ether of diethylene glycol, and methyl ether of diethylene glycol, polyethylene glycol, dipropylene glycol, polypropylene glycol, and diglycerine; ketones such as diisopropyl ketone and cyclohexanone; nitrogen-containing compounds such as dimethyl formamide, ethanol formamide; tetrahydrofurfuryl alcohol and furane compounds; hydrocarbons such as isooctane, benzene, and cyclohexane.

Solvents or diluents or oils as above illustrated may be used in ratios to the acetals which vary over a wide range depending on the particular use for the fluid. Preferably the acetal content of the fluid should fall within the range of 15 to 85% by volume, although 5–95% by volume may be used satisfactorily. When diluents are incorporated into the fluid in addition to the acetal, at least about 2 to 80% by volume diluent may be used, although 2 to 60% of diluent is preferred. The diluent may, of course, comprise more than one substance. Likewise 5 to 95% by volume of lubricant may be utilized, although 15 to 85% is preferred.

The following specific compositions, as examples, will illustrate proportions of materials which may be utilized according to this invention.

*Example 1*

|  | Parts by volume |
|---|---|
| Castor oil | 35 |
| β-(Methoxymethoxy) ethanol | 65 |

The free acid of the oil should be less than 2 and should be neutralized with an alkali such as potassium hydroxide.

*Example 2*

35 pts. by volume of castor oil (free acid value less than 2) are mixed with 65 pts. by volume β-(methoxymethoxy) ethanol containing sufficient potassium hydroxide to produce 23 gms. of potassium soap per gallon of fluid by saponifying the oil. This mixture is heated from 30 minutes to 2 hours at 160–180° C. to partially react the oil with the β-(methoxymethoxy) ethanol, producing some β-(methoxymethoxy) ethyl ester of castor oil acids by alcoholysis. This treatment produces a lower freezing point than obtained with the unreacted mixture of Example 1. In order to regulate the amount of β-(methoxymethoxy) ethanol reacted, the oil can be heated with only a part of the β-(methoxymethoxy) ethanol and the remainder added after the reaction has been completed.

Example 3

25.4 parts by volume of castor oil (acid value not more than 2) and 9.6 parts by volume of propylene glycol are reacted for 15 minutes to 2 hours at 185° C. in the presence of 47 gms. of potassium soap of castor oil acids per liter of reaction mixture to produce the propylene glycol ester of castor oil acids. 35 parts by volume of this reacted mixture are added to 65 parts of β-(methoxymethoxy) ethanol to make the complete fluid.

Example 4

24.5 parts by volume of castor oil (acid value not more than 2) and 10.5 parts by volume of ethylene glycol are reacted for 15 minutes to 2 hours at 185° C. in the presence of 63 gms. of potassium soap of castor oil acids per liter of reaction mixture to produce the ethylene glycol ester of castor oil acids. 35 parts by volume of this reacted mixture are dissolved in 65 parts by volume of β-(methoxymethoxy) ethanol to make up the complete fluid.

Example 5

25.4 parts by volume of castor oil (acid value not more than 2) and 9.6 parts by volume di-(β-hydroxyethyl) formal are reacted for 15 minutes to 2 hours at 185° C. in the presence of 47 gms. of potassium soap of castor oil acids per liter of reaction mixture to produce the di-(β-hydroxyethyl) formal ester of castor oil acids. 35 parts by volume of this mixture are dissolved in 65 parts by volume of β-(methoxymethoxy) ethanol.

Example 6

35 parts by volume of castor oil (acid value not more than 2) and 40 parts by volume of β-(methoxymethoxy) ethanol are reacted by heating for ½ to 2 hours at 160–180° C. in the presence of 23 gms. of potassium soap of castor oil acids per gallon of reaction mixture to produce the β-(methoxymethoxy) ethyl ester of castor oil acids. 25 parts by volume of isobutyl alcohol are dissolved in 75 parts by volume of this reaction mixture to make the complete fluid.

Example 7

35 parts by volume of castor oil (acid value not more than 2) and 40 parts by volume of β-(methoxymethoxy) ethanol are reacted by heating for ½ to 2 hours at 160–180° C. in the presence of 23 gms. of potassium soap of castor oil acids per gallon of reaction mixture to produce the β-(methoxymethoxy) ethyl ester of castor oil acids. 10 parts of propylene glycol and 15 parts of β-(methoxymethoxy) ethanol are dissolved in 75 parts of this reacted mixture to make the complete fluid.

Example 8

The complete fluid of Example 3 is heated for an additional 30 minutes to 2 hours at 50 to 200° C. to produce a mixture of propylene glycol and β-(methoxymethoxy) ethyl esters of castor oil acids. This treatment further improves low temperature properties.

Example 9

35 parts by volume of castor oil (acid value not more than 1) and 15 parts by volume β-(methoxymethoxy) ethanol are reacted by heating for 40 minutes at 180–200° C. in the presence of 7 gms. of the potassium soap of castor oil acids per liter of reaction mixture to produce the β-(methoxymethoxy) ethyl ester of castor oil acids. 50 pts. by volume of reaction mixture are dissolved in 50 pts. by volume of β-(methoxymethoxy) ethanol to make the complete fluid.

Example 10

40 parts by volume of castor oil (acid value not more than 2) and 20 pts. by volume of β-(ethoxymethoxy) ethanol are reacted by heating for 30 minutes to 2 hours at 180–200° C. in the presence of 6 gms. of the potassium soap of castor oil acids per liter of reaction product to produce the β-(ethoxymethoxy) ethyl ester of castor oil acids. 60 parts by volume of reaction product are dissolved in 40 pts. by volume of β-(ethoxymethoxy) ethanol to make the complete fluid.

Example 11

28 parts by volume of castor oil (acid value not more than 2) and 7 parts by volume of propylene glycol are reacted for 15 minutes to 2 hours at 185° C. in the presence of 45 gms. of the potassium soap of castor oil acids per liter of reaction mixture to produce the propylene glycol ester of castor oil acids. 35 parts by volume of this reacted product are dissolved in 65 parts by volume of β-(methoxymethoxy) ethanol to make the complete fluid.

Example 12

25.4 parts by volume of castor oil (acid value not more than 2) and 9.6 parts by volume of propylene glycol are reacted for 15 minutes to 2 hours at 185° C. in the presence of 47 gms. of potassium soaps of castor oil acids per liter of reaction mixture to produce the propylene glycol ester of castor oil acids. To make the complete fluid 35 parts by volume of this reacted mixture are added to 48 parts by volume of β-(methoxymethoxy) ethanol, 7 parts by volume isobutanol and 10 parts by volume of a mixture of the alcohols boiling in the range 120–160° C. obtained by the catalytic reduction of carbon monoxide under pressure.

Example 13

25.4 parts by volume of castor oil (acid value not more than 2) and 9.6 parts by volume of glycerine are reacted for 15 minutes to 2 hours at 185° C. in the presence of 47 gms. of potassium soaps of castor oil acids per liter of reaction mixture to produce the lower glyceryl esters of castor oil acids. 35 parts by volume of this reacted mixture are added to 65 parts by volume of β-(methoxymethoxy) ethanol to make the complete fluid.

Example 14

24.4 parts by volume of blown soyabean oil (Gardner-Holdt viscosity 40–70 secs. at 25° C.) are reacted for 1 hour at 225° C. with 15.6 parts by volume of di-(β-hydroxyethyl) formal using 55 gms. of the potassium soaps of blown soyabean oil acids per gallon of finished fluid as catalyst. 40 parts by volume of this reacted mixture are mixed with 60 parts by volume of β-(methoxymethoxy) ethanol to make the complete fluid.

Example 15

24 parts by volume of blown corn oil (Gardner-Holdt viscosity 40–70 secs. at 25° C.) are reacted for 1 hour at 225° C. with 16 parts by volume of di-(β-hydroxyethyl) formal using 55 gms. of the potassium soaps of blown corn oil acids per gallon of finished fluid as catalyst. 40 parts by volume of this reacted mixture are mixed with 60 parts by volume of β-(methoxymethoxy) ethanol to make the finished fluid.

Example 16

20 parts by volume of blown peanut oil (Gardner-Holdt viscosity 30–60 secs. at 25° C.) are reacted for 1 hour at 225° C. with 15 parts by volume of di-(β-hydroxyethyl) formal using 55 gms. of the potassium soaps of blown peanut oil acids per gallon of finished fluid as catalyst. 35 parts by volume of this reacted mixture are mixed with 65 parts by volume of β-(methoxymethoxy) ethanol to make the finished fluid.

Example 17

20 parts by volume of blown cottonseed oil (Gardner-Holdt viscosity 30–60 secs. at 25° C.) are reacted for 1 hour at 225° C. with 15 parts by volume of di-(β-hydroxyethyl) formal using 55 gms. of the potassium soaps of blown cottonseed oil acids per gallon of finished fluid as catalyst. 35 parts by volume of this reacted mixture are mixed with 65 parts by volume of β-(methoxymethoxy) ethanol to make the finished fluid.

Various changes may be made in the details and preferred embodiments of the present invention without departing therefrom or sacrificing any of the advantages thereof.

We claim:

1. A fluid composition adapted for use in fluid actuated apparatus consisting of at least 15 parts of a normally liquid non-cyclic acetal containing an alkanol group, from 15 to 85 parts by volume of a compound selected from the group consisting of vegetable oils, blown vegetable oils and reaction products of such oils with a compound selected from the group consisting of mono-, di- and trihydric alcohols, the remaining parts to give a total of 100 parts by volume consisting of a diluent selected from the group consisting of mono, di, and trihydric alcohols having the formula $R_x(OH)_x$ in which R is a hydrocarbon group and $x$ is from 1 to 3, inclusive.

2. A fluid composition adapted for use in fluid actuated apparatus consisting of at least 15 parts of beta-(methoxymethoxy)ethanol, from 15 to 85 parts by volume of a compound selected from the group consisting of vegetable oils, blown vegetable oils and reaction products of such oils with a compound selected from the group consisting of mono-, di- and trihydric alcohols the remaining parts to give a total of 100 parts by volume consisting of a diluent selected from the group consisting of mono, di, and trihydric alcohols having the formula $R_x(OH)_x$ in which R is a hydrocarbon group and $x$ is from 1 to 3, inclusive.

3. A fluid composition adapted for use in fluid actuated apparatus comprising at least 15 parts by volume of a normally liquid non-cyclic acetal having the structural formula:

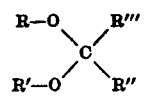

wherein R and R' are aliphatic radicals having not more than 5 carbon atoms and R'' and R''' are hydrogen or aliphatic radicals having not more than 4 carbon atoms, at least one of the group R, R', R'' and R''' containing a hydroxyl group, from 15 to 85 parts of a castor oil derivative of a compound selected from the group consisting of mono-, di- and trihydric alcohols, any remaining parts to give a total of 100 parts of a compound selected from the group consisting of mono-, di- and trihydric alcohols having the formula $R_x(OH)_x$ in which R is a hydrocarbon group and $x$ is from 1 to 3 inclusive.

4. A fluid composition adapted for use in fluid actuated apparatus comprising 15 parts of beta-(methoxy methoxy) ethanol, from 15 to 85 parts by volume of a castor oil derivative of a compound selected from the group consisting of mono-, di- and trihydric alcohols, the remaining parts to give a total of 100 parts by volume consisting of a diluent selected from the group consisting of mono-, di- and trihydric alcohols having the formula $R_x(OH)_x$ in which R is a hydrocarbon group and $x$ is from 1 to 3 inclusive.

5. A fluid composition adapted for use in fluid actuated apparatus comprising per 100 parts by volume at least 15 parts of beta-(methoxymethoxy) ethanol, 15 to 85 parts by volume of the product obtained by reacting 15 to 40 parts by volume of a vegetable oil with 5 to 30 parts by volume of a compound selected from the group consisting of mono-, di- and trihydric alcohols in the presence of a catalyst selected from the group consisting of potassium oleate, potassium ricinoleate, potassium carbonate, potassium hydroxide and lead oxide, any remaining parts to give a total of 100 parts consisting of a diluent selected from the group consisting of mono-, di and trihydric alcohols having the formula $R_x(OH)_x$ in which R is a hydrocarbon group and $x$ is from 1 to 3 inclusive.

JOHN C. WOODHOUSE.
KENNETH E. WALKER.